Feb. 14, 1950 W. H. E. SAMUELSON 2,497,275

QUARTZ OSCILLATOR PLATE

Filed Oct. 6, 1945

INVENTOR

WALLACE H.E. SAMUELSON

BY

Pennie, Davis, Marvin and Edmonds Attorneys

Patented Feb. 14, 1950 2,497,275

UNITED STATES PATENT OFFICE 2,497,275

QUARTZ OSCILLATOR PLATE

Wallace H. E. Samuelson, Weehawken, N. J., assignor, by mesne assignments, to Reeves Hoffman Corporation, Carlisle, Pa., a corporation of Pennsylvania Application October 6, 1945, Serial No. 620,722

4 Claims. (Cl. 171—327)

This invention relates to the manufacture of quartz oscillator plates and the like and has for its object certain improvements in such products as an article of manufacture.

Quartz oscillator plates tend to lose activity on ageing, for example, by being stored. Various treatments of the plates have been proposed to restore the activity of the plates, at least in large part. Among such treatments is that of sputtering the plates with a suitable metal, such as gold. The most common method is to cover the plates completely with a thin layer or coating of gold, not only the surfaces of the two major sides or faces but also the surfaces of the edge portions of the plates. For oscillating purposes, the plates must have high electrical resistance between the surfaces of the two major faces and it is, therefore, necessary to remove the gold from the edges of the plates. This is usually done by abrading the gold from the edge portions of the plates. As a result of the abrading operation, the oscillator plates are frequently scratched, and this in turn impairs their oscillating characteristics.

The all-gold coated oscillator plates tend to have further undesired characteristics. For example, they tend to have a lower activity than that of the uncoated, but unaged, plates. Some of the coated oscillator plates also tend to oscillate with a spurious frequency. This latter trait is especially detrimental because its occurrence is erratic, unpredictable and not necessarily reproducible even in the same oscillator plate. An uncoated quartz oscillator plate which exhibits no spurious frequency may show one or more after being covered with gold.

As a result of my investigations, I have discovered that if the quartz oscillator plates are coated with metal in a certain manner, disadvantages of the kind enumerated may be largely overcome. The thin film, coating or layer of metal may be deposited on the oscillator plates in such a manner as to make unnecessary the customary abrading operation on the edge portions and thus minimize greatly the chances of scratching or otherwise impairing the two main surfaces of the oscillator plates.

In accordance with the product of the invention, the quartz oscillator plate contains a film of a suitable metal on substantially the entire surface of one side of the plate and a similar film of metal on a spot located on the other side of the plate.

The two main sides or surfaces of the oscillator plates are advantageously covered simultaneously with metal in the manner indicated. This can be done in such a way that the side of the plate containing the spot will contain no metallic deposit other than the spot. This spot is advantageously located centrally of the oscillator plate and is preferably of predetermined size, depending upon the size and intended use of the oscillator plate.

In a presently preferred practice of the invention, the metallic films are deposited on the oscillator plates by means of a high voltage across a metal anode and one or more metal cathodes operating in an evacuated chamber having the necessary electrical connections. The cathode disintegrates and the metal of which it is made is deposited or tends to deposit upon the anode as an extremely thin and homogeneous film. A flat sheet or plate of aluminum is advantageously employed as the anode, the anode being punched with a plurality of spaced holes of a size corresponding to the metallic spots to be placed on the oscillator plates. The cathodes are advantageously made of gold. The anode plate is horizontally disposed and equidistantly spaced between a pair of the cathodes in a present practice of the invention.

The oscillator plates are placed on the aluminum anode, each plate being centered over one of the holes in the anode. The upper surface of each oscillator plate is completely exposed, as is so much of the lower surface of each oscillator plate over the holes. The remainder of the lower surface of the oscillator plates is in contact with the aluminum anode and is, therefore, masked off.

The chamber is evacuated in the usual manner and high voltage current is passed across the anode and cathodes. This causes the gold in the cathodes gradually to disintegrate, filling the chamber with gold vapor which deposits or tends to deposit on the aluminum anode and, therefore, deposits a film on the exposed upper surface of the oscillator plates and so much of the under surface of the oscillator plates as is exposed by the holes in the aluminum anode.

The invention will be better understood by referring to the accompanying drawing, taken in conjunction with the following description, in which—

Figure 1:
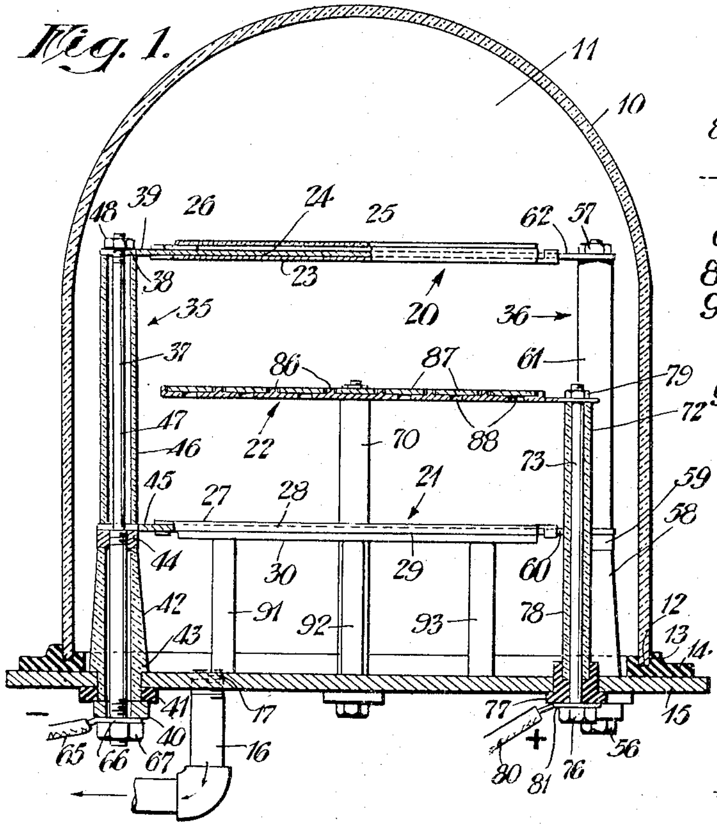
Fig. 1 is a side elevation in section on the line 1—1 of Fig. 2 of an apparatus illustrative of a practice of the invention.

Referring first to Fig. 1, the apparatus shown comprises a glass bell-jar or cover 10, defining a chamber 11. The lower circumferential edge portion 12 of the bell-jar fits snugly within an annular groove 13 of a rubber gasket 14 resting on a metal base 15. The bell-jar and rubber gasket are readily removable as a unit from the steel base. One end of a conduit 16 is non-leakably screwed into an opening 17 in base 15, thus communicating with chamber 11, and the other end of the conduit connects with a source of vacuum, not shown.

The parts located within chamber 11 comprise a pair of spaced metallic cathodes 20 and 21 and a metallic anode 22 midway between the two, all horizontally disposed to base 15. In a presently preferred practice, the cathodes are formed of gold and the anode of aluminum. Thus, upper cathode 20 is formed of a thin sheet of gold or gold foil 23 underlying an appropriately supported upper aluminum plate 24, the overlying edge portion 25 of the gold sheet being bent upwardly and over the top of the edge portions of a glass plate 26 resting on the top of the upper aluminum plate. In similar fashion, lower cathode 21 is also formed of a thin sheet of gold or gold foil 27 overlying an appropriately supported lower aluminum plate 28, the overlying edge portion 29 of the gold sheet being bent downwardly and over the top of the edge portion of an appropriately supported glass plate 30 located immediately below the lower aluminum plate.

As shown, upper aluminum plate 24 and lower aluminum plate 28 are held in position by two oppositely located vertical supports 35 and 36, the former being provided with an electrical conductor. Thus, support 35 consists of a vertically disposed conductor rod 37 threaded at both ends, the lower end of which extends through an opening in base 15 and the upper end of which extends through a slotted opening 38 in a shoulder portion 39 of upper aluminum plate 24. The conductor rod is held in position by means of a nut 40 secured well above the lower end of the rod, an insulating washer 41 being disposed between the nut and the lower side of base 15, and a truncated porcelain insulator 42, the lower portion of which is reduced in size to fit snugly in the same opening of the base through which the rod extends, thus forming a shoulder portion 43 resting upon the base. The truncated porcelain insulator fits around an enlarged lower section of the conductor rod, the upper end of the enlarged section being threaded to receive a stop nut 44. The conductor rod extends through a slotted opening in a shoulder portion 45 of lower aluminum plate 28 which rests on the nut. A cylindrical porcelain insulator 46 fits around the upper and reduced section 47 of the conductor rod, the lower end of the insulator resting on the top of shoulder portion 45 of lower aluminum plate 28. The upper end of the insulator terminates at the upper threaded end of the conductor rod. Shoulder portion 39 of upper aluminum plate 24 is located on the upper end of the insulator and is secured thereto by means of a nut 48 turned tightly on the upper threaded portion of the conductor rod.

Vertical support 36 is advantageously constructed in the same manner as vertical support 35. It is therefore unnecessary to describe its construction in detail. It consists of a rod 55 threaded at both ends to receive nuts 56 and 57, and thereby hold in place truncated insulator 58, nut 59, slotted shoulder 60 of lower aluminum plate 28, cylindrical insulator 61 and slotted shoulder 62 of upper aluminum plate 24. In the construction shown, however, vertical support 36 is not designed to form part of an electrical circuit.

Returning to vertical support 35, its electrical connection is provided by means of a high voltage line 65, connectible with a source of current, not shown, and a terminal 66 secured to conductor rod 37. The terminal is disposed between nut 40 and a securing nut 67 on the lower end of the conductor rod.

Turning next to anode 22, it will be noted that it is held in position by three spaced vertical supports 70, 71 and 72. They are similar in construction, except that the latter is connectible electrically with the source of high voltage current to be employed. Thus, vertical support 72 consists of a vertically disposed conductor rod 73 threaded at both ends, the lower end of which extends through an opening in base 15 and the upper end of which extends through a slotted opening 74 in a shoulder portion 75 of aluminum plate 22. The conductor rod is held in position by means of a nut 76 secured to the lower end of the rod, an insulating bushing 77, which fits snugly in the hole in the base, a cylindrical porcelain insulator 78 and a nut 79 secured to the upper end of the conductor rod. The electrical connection is provided by means of a high voltage line 80, connectible with the source of high voltage current, and a terminal 81. The terminal is disposed between nut 76 and insulating bushing 77.

Still referring to anode 22, which, as stated, is an aluminum plate, in a presently preferred practice of the invention, it will be noted that its top portion is subdivided into a plurality of rectangular recesses 85 spaced from one another by relatively narrow criss-cross top portions 86 of the aluminum plate. The rectangular recesses are preferably of a size easily to accommodate rectangular quartz oscillator plates 87. While rectangular recesses are shown, it will be obvious that they may be circular or in other desired configuration. In the construction shown, each recess is provided with a centrally located hole 88, preferably of predetermined size so as to make possible a sputtered spot of predetermined size. An advantage of the recess is that when an oscillator plate is placed therein, it is automatically centered or aligned with the hole in the recess so that the spot of the oscillator plate to be sputtered is centrally located.

Figures 6, 7:
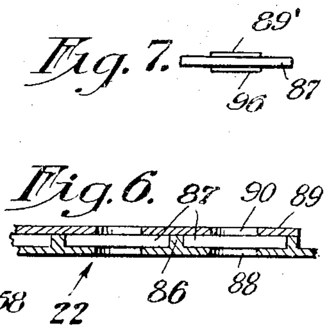
Fig. 6 is a sectional elevation in part of an anode and a mask for a modified practice.
Fig. 7 is an enlarged end view of the quartz oscillator plate of Fig. 6.
Figures 2, 8:
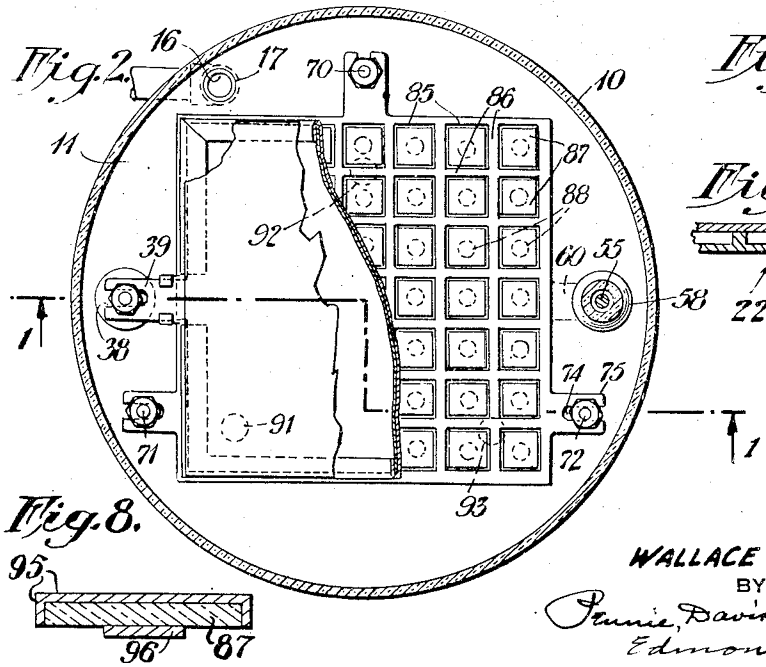
Fig. 2 is a plan view partly in section and partly in fragmentary sections of the same apparatus.
Fig. 8 is a transverse sectional view taken along the line 8—8 of Fig. 4.

Referring again to anode 22, as more particularly illustrated in Fig. 6, a modified practice is shown in part. It may be desirable to sputter a spot on both major faces of the oscillator plates. This may be accomplished, for example, by placing a mask 89 on the top of anode 22, the mask being provided with a plurality of suitably spaced holes 90, preferably juxtaposed to holes 88 in the anode proper.

Glass plate 30, which is located immediately below and preferably in contact with lower aluminum plate 28 forming a part of the lower cathode construction, is freely supported on three vertically disposed and spaced supports 91, 92 and 93, resting on base 15. The supports may, for example, be formed of cylindrical porcelain, such as used in the other vertical supports. The supports for the glass plate may merely rest on the base, although they may be secured thereto, if desired.

Figures 3, 4, 5:
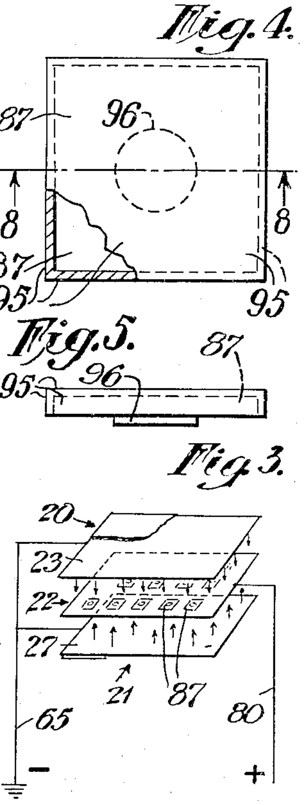
Fig. 3 is a diagrammatic representation of the internal arrangement of the apparatus.
Fig. 4 is an enlarged plan view with a cutaway portion of a quartz oscillator plate treated in the apparatus.
Fig. 5 is an end view of the quartz oscillator plate of Fig. 4.

The apparatus described may be operated as follows in the practice of the invention:

With bell-jar 10 removed, a quartz oscillator plate 87 is placed in each recess 85 of anode 22. The bell-jar is then returned to cover the anode-cathodes-assembly and chamber 11 is evacuated through conduit 16 to a suitable subatmospheric pressure. High voltage current is next applied across terminals 66 and 81 and thus across cathode 20 and anode 22 and across anode 22 and cathode 21. This causes gold foil 23 of cathode 20 and gold foil 27 of cathode 21 gradually to disintegrate, filling chamber 11 with sputtered gold vapor. Some of the gold vapor is deposited on exposed surfaces of the quartz oscillator plates to form a thin and homogeneous film. The top and edge and the bottom circular spot surfaces, being the only portions of the oscillator plates thus exposed, are therefore covered with gold in this manner. After a suitable interval of time, enough to deposit the desired amount of gold, the application of current is discontinued and the vacuum broken; after which the bell-jar is removed and the treated oscillator plates are removed. In Figs. 4 and 5, the deposit is shown as a top and edge film 95 and a bottom spot 96.

If, on the other hand, it is desired to sputter a spot on each major face of oscillator plates 87, mask 89 is placed on the top of anode 22. As sputtering of gold from cathodes 20 and 21 takes place, spots 89' are also placed on the oscillator plates. Portions of the oscillator plates covered by the mask will then obviously not be sputtered with the gold. When the spots are centered in the manner indicated, they provide electrode contacts, which brings the electric field to the center of the oscillator plates where it does the most good.

While in the practice described above high voltage cathode sputtering is employed, it will be clear to those skilled in this art that other means may be employed to deposit the film of metal in the manner desired. Arc sputtering may also be used. Pencils of the metal to be deposited may be brought together with a suitable electromotive-force applied between them. A voltage may be applied between the cathode of the arc and the oscillator plate to cause the metal ions to pass over the exposed surface of the plate to be coated. Various evaporation methods may be employed, such as distillation of the metal to be deposited from a heated container in the chamber, or thermal evaporation of the metal, for example, as a coating from heated tungsten filament. It will thus be clear to those skilled in this art that the practice of the invention lends itself readily to a number of highly useful modifications.

I claim:

1. As an article of manufacture, a quartz oscillator plate, a film of suitable deposited metal on and completely covering the entire surface of one major face of said plate, and a spot-like film of similar deposited metal on the opposite major face of said plate having its entire edge spaced inwardly from the edge of said plate.

2. As an article of manufacture, a quartz oscillator plate, a film of suitable metal on substantially the entire surface of one major face of said plate, a similar spot-like film of metal on the other major face of said plate, and a film of metal on the edges of said plate and comprising a continuation of the film substantially covering the entire surface of the first mentioned major face of the plate.

3. As an article of manufacture, a quartz oscillator plate, a film of suitable metal on substantially the entire surface of one major face of said plate, a similar spot-like film of metal centrally located on the other major face of said plate, and a film of metal on the edges of said plate and comprising a continuation of the film substantially covering the entire surface of the first mentioned major face of the plate.

4. As an article of manufacture, a quartz oscillator plate, a film of gold on substantially the entire surface of one major face of said plate, a similar spot-like film of gold on the other major face of said plate, and a film of gold on the edges of said plate and comprising a continuation of the film substantially covering the entire surface of the first mentioned major face of the plate.

WALLACE H. E. SAMUELSON.

REFERENCES CITED

The following references are of record in the file of this patent:

UNITED STATES PATENTS

| Number | Name | Date |
|---|---|---|
| 1,848,630 | Hulburt | Mar. 8, 1932 |
| 1,915,368 | Lack | June 27, 1933 |
| 2,178,224 | Diehl | Oct. 31, 1939 |
| 2,249,933 | Bechmann | July 22, 1941 |
| 2,343,059 | Hight | Feb. 29, 1944 |